Dec. 13, 1966   H. HERGER ET AL   3,291,379
PRESSURE WAVE MACHINE

Filed July 20, 1964   2 Sheets-Sheet 1

INVENTORS
Hans Herger
Alfred Wunsch

BY Pierce, Scheffler & Parker
ATTORNEYS

Dec. 13, 1966   H. HERGER ET AL   3,291,379
PRESSURE WAVE MACHINE
Filed July 20, 1964   2 Sheets-Sheet 2
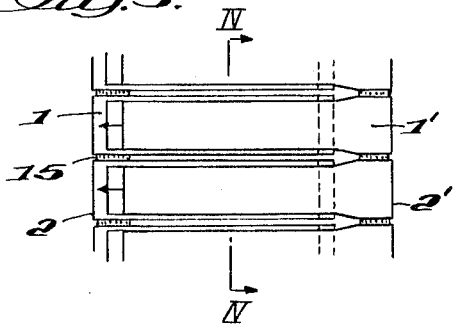
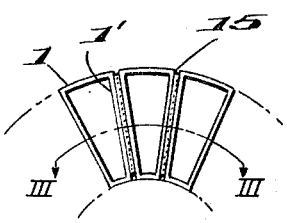
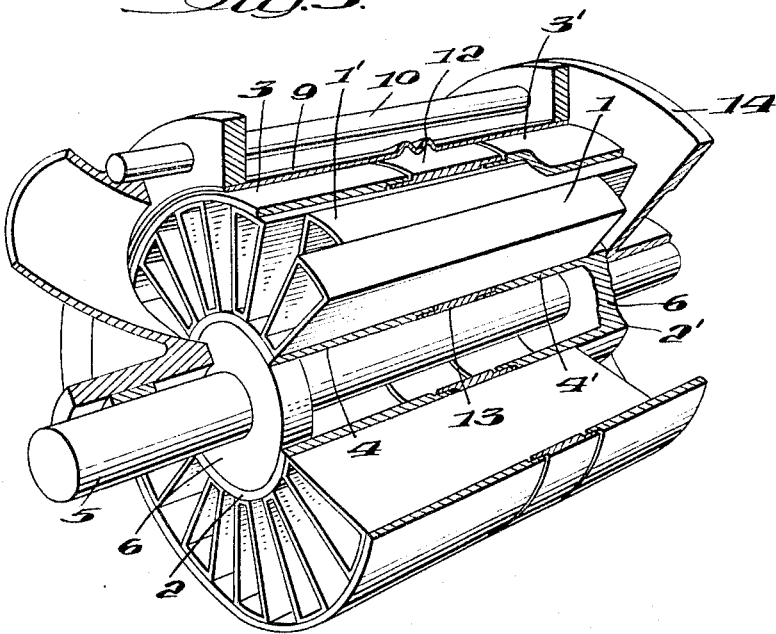
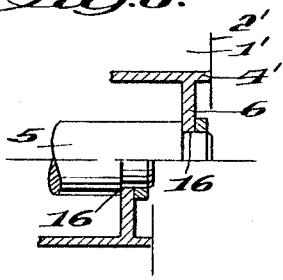
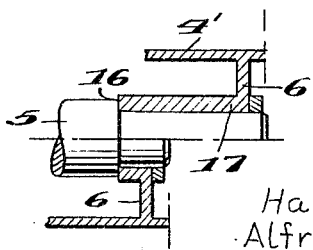
INVENTORS
Hans Herger
Alfred Wunsch
BY Pierce, Scheffler & Parker
ATTORNEYS

United States Patent Office 3,291,379
Patented Dec. 13, 1966

3,291,379
PRESSURE WAVE MACHINE
Hans Herger, Ennetbaden, and Alfred Wunsch, Wettingen, Switzerland, assignors to Aktiengesellschaft Brown, Boveri & Cie., Baden Switzerland, a joint-stock company of Switzerland
Filed July 20, 1964, Ser. No. 383,882
Claims priority, application Switzerland, Aug. 14, 1963, 10,067/63
13 Claims. (Cl. 230—69)

The invention relates to a pressure wave machine for gaseous media, wherein a rotor consisting at least of a shaft, hub, cells and shrouding moves in a stationary housing made up of a middle part and side parts.

Pressure wave machines utilize intermittent flow effects to compress a low-pressure gas by the expansion of a high-pressure gas. The process takes place in open-ended cells which are disposed on a rotor and which move past intake and exhaust ducts in the side parts of the housing. For perfect operation of the machine and good efficiency, the leakage losses at the rotor ends have to be reduced to a minimum, i.e., a very small axial clearance must be maintained between the rotor and the side parts of the housing. Since the rotor cells alternately receive hot and cold gas while the middle part of the housing receives only leakage gas, and the temperatures can vary rapidly and very intensively according to the operating point, there arises non-uniform thermal expansion between the rotor and the middle part of the housing. Such varying lengths either cause excessive axial clearances which are detrimental to operation, or the rotor to rub against the side parts of the housing.

Means for keeping the axial clearance constant are required if the machine is to operate reliably with a good efficiency. In some known solutions of this problem, one end wall of the housing is displaced via an additional axial bearing in direct dependence on the rotor expansion. The disadvantage of such constructions is that they require considerable structural outlay, such as devices for equalizing moments at the movable walls, guides for the sliding parts of the housing, etc. This gives rise to numerous new design problems, for example, additional bearings or bearings in hot gas housings.

In another construction, hot gas flows through the housing end wall suspension. The axial clearance between the rotor and the side part of the housing controls the gas flow and hence, the supply of heat to the wall suspension. Thermal expansion of the wall suspension due to the varying supply of heat displaces the end wall in relation to the rotor. Apart from the disadvantage of the complex construction, this design is unsuitable for rapidly changing operating conditions of the kind occurring, for example, in the supercharging of internal combustion engines, since it is much too inert.

A pressure wave machine is therefore required wherein the length of the rotor and housing change by the same amount or a change of length is completely prevented in a constructionally simple manner.

The pressure wave machine according to the invention solves this problem by means for maintaining an at least approximately constant length of the rotor and the housing middle part in every state of operation and irrespective of the temperature of the media, so that the axial clearance between the rotor and the side parts of the housing also remain substantially constant.

A number of exemplified embodiments of a pressure wave machine according to the invention are illustrated in the drawing, wherein:

FIGS. 1, 2 and 5 show various constructions of the rotor and parts of the housing in perspective and partial section.

FIG. 3 is a diagrammatic view of a construction in section along the line III—III in FIG. 4.

FIG. 4 shows the same construction in section along the line IV—IV in FIG. 3.

FIGS. 6 and 7 show details of the construction in axial section.

Like parts have been given like references in all the figures.

The basic solution of the problem is that the rotor is divided transversely of the longitudinal axis, but not the cells, which are so arranged or designed as to interfit on assembly and permit axial thermal expansion. The two rotor ends are rigidly connected to the shaft, which is so designed as to undergo only insignificant or practically no change of length. The rotor cells in which the working process takes place can move in relation to one another in the event of temperature variations without any variation in the total length of the rotor. The variations in length of the middle part of the housing are taken by a compensating device.

Figure 1:
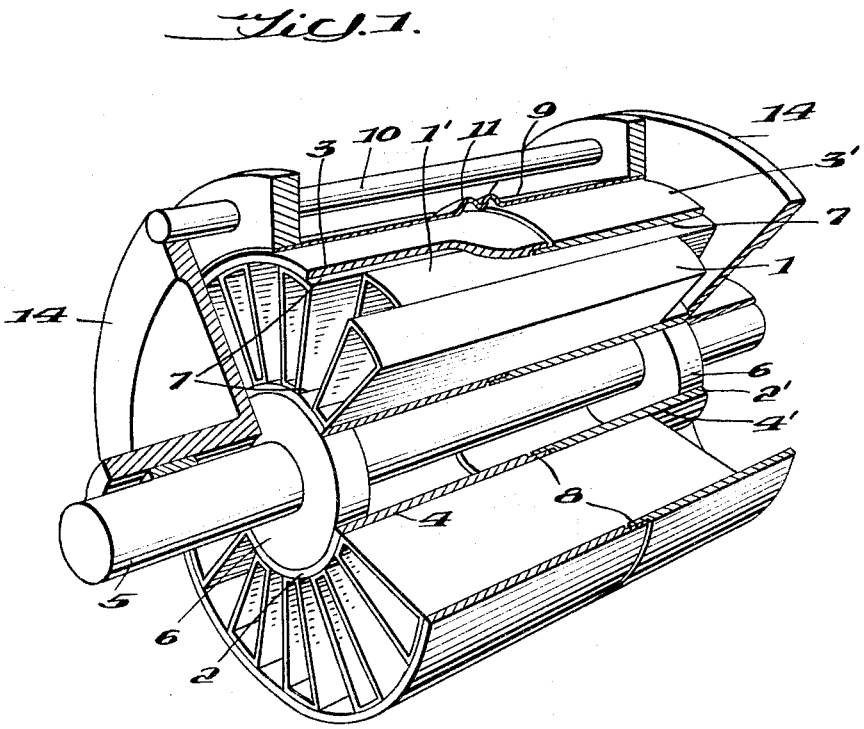

FIG. 1 shows a construction on this principle. The rotor consists of the cylindrical assembly of cells 1, 1′, the two-section cylindrical shrouding 3, 3′ at the outer periphery of the cylindrical cell assembly, the two-section cylindrical hub 4, 4′ at the inner periphery of the cylindrical cell assembly, the shaft 5 and—in this example—the hub discs 6. The cells are so incorporated between the shrouding and hub parts 3 and 4 and 3′ and 4′ respectively that only every other cell exists in the two resultant rotor parts so that after assembly each cell projects into a gap on the opposite side and is thus simultaneously guided.

The ends of the two rotor parts are rigidly connected to the shaft near the ends 2 and 2′. The cells, which do not extend completely to the end face at the other end, thus have a fixed point and can expand alternately from the fixed ends in the event of temperature variations. The two shrouding and hub parts each have a telescoping overlap 8 with sufficient axial clearance at the joints. By this construction of the individual elements of the rotor the latter can compensate axial thermal expansion without changing its total length. The flow of medium from one cell to the other is restricted to a minimum since the detrimental gap between the cell walls extends practically over the entire rotor length. Leakage losses at the joints of the shrouding and hub parts are greatly reduced by the overlap.

The shaft 5 is already cooler than the cells since it does not come into direct contact with the hot gas flow. If, however, it is found necessary, it can be constructed as a bimetallic structure, be made of a material having a very low coefficient of thermal expansion, or have a coolant flowing through it in order to prevent any changes of length due to temperature changes.

A constant length for the cylindrical housing part 9 flanged on the housing side parts 14 and surrounding the cylindrical shrouding 3–3′ is obtained by means of bolts 10 disposed in the cold part of the machine. To compensate axial thermal expansion of the middle part 9 a corrugated compensation element 11 is provided, although other constructions are possible for this purpose.

By these means it is possible to keep at least approximately constant both the rotor and the middle part of the housing for every state of operation and for every temperature of the media participating in the process, so that consequently there is a substantially constant axial clearance between the rotor and the side parts of the housing.

Figure 2:
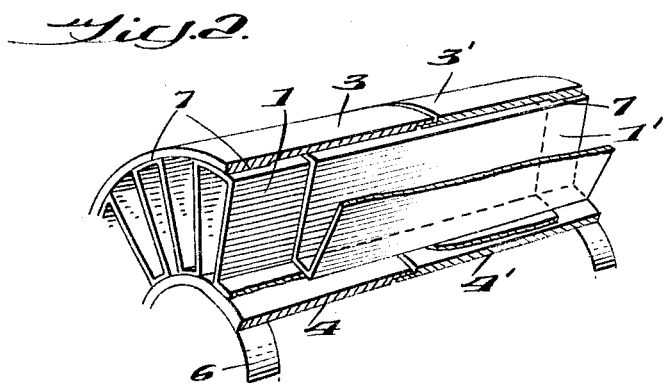

The shrouding and hub are advantageously divided in the middle to give two equal symmetrical rotor halves. The connection 7 between the cells and the shrouding and the hub may be a mechanical connection or alternatively a welded or soldered connection. The cells may be constructed as closed box sections as shown in FIGS. 1, 3, 4 and 5 or be made from a strip bent meander-fashion as shown in FIG. 2, but with this construction and the construction as shown in FIGS. 3 and 4 the two rotor parts are no longer equal.

FIGS. 3 and 4 show another possible construction of the rotor. Here each cell is formed by two interfitted box sections 1 and 1'. Each rotor part contains the full number of cells which are connected together by a weld 15 near the end faces 2 and 2'. The cross-section of the cells of one rotor part is somewhat smaller than that of the cells of the other rotor part so that they slide one inside the other on assembly. This gives twice the sealing length between the cells in comparison with the constructions shown in FIGS. 1 and 2. FIG. 3 shows the direction of expansion and the end position of the cells. With this embodiment the shrouding can be replaced by a wire band soldered thereon, which is simple and inexpensive to produce and which radially gives sufficient sealing from the middle part 9 of the housing since the grooves formed by the coiling of the wire act as labyrinths.

Apart from the possibility of compensating for thermal expansion, the two-piece construction of the cell wheel has other advantages. The correct operation of pressure wave machines depends decisively on the adjustment of the intake and exhaust aperture edges which control the compression and rarefaction processes and whose position must be adapted to the length and speed of movement of the cells and the rate of propagation of the pressure waves in the gases. At the same time, however, the ratio of the speed of movement to the length of the cells is also important since the heat exchange between the gases and of the gases and the wall, together with friction, are important factors as well. An optimum rotor length is associated with each rotor speed to reduce losses to a minimum.

Where pressure wave machines have to be manufactured in certain standard sizes and for different uses, it is therefore necessary to adapt the rotor length to conditions as accurately as possible. The constructions shown in FIGS. 1 to 4 very easily enable the rotor length to be finely adapted to different operating conditions.

FIG. 5 shows an example of this. The construction of this machine is similar to that shown in FIG. 1, but an intermediate ring 12 has been inserted between the shrouding parts 3 and 3' and an intermediate ring 13 between the hub parts 4 and 4'. The rotor length can be adapted to each particular use with very little work by changing the axial length of these intermediate rings. In these conditions the cells overlap to varying degrees and the middle part of the housing being a simple structural element requires no special adjustment means.

The hub discs 6 must also be included in the adjustment to the required rotor length. As shown in FIG. 6, the shaft collar 16 against which the hub disc bears can be turned according to requirements. The two halves of FIG. 6 show the position of the hub disc on the shaft for different rotor lengths.

FIG. 7 shows another possible construction. In this case, the shaft collar position remains unchanged and only the hub disc part 17 bearing on the shaft is shortened for adjustment purposes, the hub disc 6 being kept in stock according to the maximum rotor length. Part 17 may also be in the form of an independent ring. In this example too, the two halves of the figure show the position of the hub disc for different rotor lengths. It is self-evident that in both cases shown in FIGS. 6 and 7 the surplus piece of shaft is turned off for the shorter rotors.

The utility of pressure wave machines depends on the minimum invariable clearance between the rotor and the side parts of the housing. The difficulties arising in connection with maintaining axial clearance were hitherto a serious obstacle to the embodiment of the project. The principle now proposed employing a rotor and a housing of a constant length and favorable sealing properties which remain unchanged on heating and cooling, gives a high degree of operational reliability combined with a good efficiency. The fact that the rotor length can also be finely adjusted to different operational requirements is very important to the mass-production of pressure wave machines, since one rotor type which can be rationally manufactured in large numbers can be used for a wide range of applications.

We claim:

1. A rotor structure for a pressure wave machine for effecting a change in pressure of gaseous media, said rotor structure including a shaft mounting the rotor for rotation about its axis, and a cylindrical assembly of open-ended cells, each said cell of said cell assembly being secured at only one end thereof to one end only of said rotor and extending longitudinally towards the other end of said rotor in an unsecured manner thereby to permit unrestricted thermal expansion of the cell walls in the direction of but not reaching to said other rotor end, and thereby maintaining constant the overall length of said cell assembly notwithstanding a change in temperature of the cell walls.

2. A rotor structure as defined in claim 1 for a pressure wave machine wherein one cell of said cell assembly is secured at one end of said rotor and an adjacent cell is secured at the opposite end of said rotor.

3. A rotor structure as defined in claim 1 for a pressure wave machine wherein each said cell of said cell assembly includes two longitudinally extending telescoping cell sections, one section of each cell being secured at one end of said rotor and the other section of the same cell being secured at the opposite end of said rotor.

4. A rotor structure as defined in claim 3 for a pressure wave machine wherein the cell sections secured at the same end of said rotor are constituted by individual box sections.

5. A rotor structure as defined in claim 3 for a pressure wave machine wherein the cell sections secured at the same end of said rotor are constituted from a common length of strip material bent in a meander manner.

6. A rotor structure as defined in claim 1 for a pressure wave machine wherein said rotor structure also includes a cylindrical hub located at the inner periphery of said cylindrical cell assembly, said hub being constituted by two cylindrical sections, the outer ends of said hub sections being secured respectivetly at opposite ends of said rotor and the inner ends of said hub sections being overlapped in a telescoping manner and unsecured thereby to permit unrestricted thermal expansion in the longitudinal direction.

7. A rotor structure as defined in claim 1 for a pressure wave machine wherein said rotor structure also includes a cylindrical hub located at the inner periphery of said cylindrical cell assembly, said hub being constituted by three cylindrical sections, the outer ends of the two outermost hub sections being secured respectively at opposite ends of said rotor and the opposite ends of the third hub section being overlapped in a telescoping manner with the inner ends of said outermost hub sections and unsecured thereby to permit unrestricted thermal expansion of said hub sections in the longitudinal direction.

8. A rotor structure as defined in claim 1 for a pressure wave machine wherein said rotor structure also includes a cylindrical shroud located at the outer periphery of said cylindrical cell assembly, said shroud being constituted by two cylindrical sections, the outer ends of said cylindrical shroud sections being secured respectively to opposite ends of said cell assembly and the inner ends of said cylindrical shroud sections being overlapped in a telescoping manner and unsecured thereby to permit unrestricted thermal expansion in the longitudinal direction.

9. A rotor structure as defined in claim 1 for a pressure wave machine wherein said rotor structure also includes a cylindrical shroud located at the outer periphery of said cylindrical cell assembly, said shroud being constituted by three cylindrical sections, the outer ends of the two outermost shroud sections being secured respectively at opposite ends of said cell assembly and the opposite ends of said third shroud section being overlapped in a telescoping manner with the inner ends of said outermost shroud sections and unsecured thereby to permit unrestricted thermal expansions of said shroud sections in the longitudinal direction.

10. A rotor structure as defined in claim 1 for a pressure wave machine wherein said rotor structure includes a cylindrical hub located at the inner periphery of said cylindrical cell assembly, said hub being constituted by two cylindrical sections, the outer ends of said hub sections being secured respectively at opposite ends of said rotor and the inner ends of said hub sections being overlapped in a telescoping manner and unsecured thereby to permit unrestricted thermal expansion in the longitudinal direction, said rotor structure further including a cylindrical shroud located at the outer periphery of said cylindrical cell assembly, said shroud being constituted by two cylindrical sections, the outer ends of said cylindrical shroud sections being secured respectively to opposite ends of said cell assembly and the inner ends of said cylindrical shroud sections being overlapped in a telescoping manner and unsecured thereby to permit unrestricted thermal expansion in the longitudinal direction.

11. A rotor structure as defined in claim 1 for a pressure wave machine wherein said rotor structure also includes a cylindrical housing surrounding said cylindrical cell assembly the opposite ends of said housing being secured at the opposite ends of said rotor structure and the middle part of said housing including a corrugated thermal compensating element.

12. A rotor structure as defined in claim 1 for a pressure wave machine wherein the opposite ends of said rotor structure are rigidly secured to said shaft, and said shaft is constituted by a bi-metallic structure to prevent any change in the length thereof during operation of the machine as a result of temperature changes.

13. A rotor structure as defined in claim 1 for a pressure wave machine wherein the opposite ends of said rotor structure are rigidly secured to said shaft, and said shaft is constructed from a material having a very low coefficient of thermal expansion which thereby prevents any appreciable change in shaft length during operation as a result of temperature changes.

References Cited by the Examiner

UNITED STATES PATENTS

| | | | |
|---|---|---|---|
| 1,897,947 | 2/1933 | Howell | 230—134 |
| 2,347,034 | 4/1944 | Doran | 253—77 |
| 2,766,928 | 10/1956 | Jendrassik | 230—69 |
| 2,935,296 | 5/1960 | Hockert et al. | 253—77 |
| 3,086,697 | 4/1963 | Gardiner et al. | 230—69 |

FOREIGN PATENTS

| | | |
|---|---|---|
| 553,208 | 5/1943 | Great Britain. |
| 867,719 | 5/1961 | Great Britain. |

MARK NEWMAN, *Primary Examiner.*

W. L. FREEH, *Assistant Examiner.*